United States Patent [19]

Tate

[11] 4,274,378
[45] Jun. 23, 1981

[54] IGNITION CONTROL SYSTEM FOR AN INTERNAL COMBUSTION ENGINE

[75] Inventor: Takao Tate, Susono, Japan

[73] Assignee: Toyota Jidosha Kogyo Kabushiki Kaisha, Toyota, Japan

[21] Appl. No.: 43,464

[22] Filed: May 29, 1979

[30] Foreign Application Priority Data

Dec. 8, 1978 [JP] Japan ............................ 53/167963[U]

[51] Int. Cl.³ ............................................... F02P 5/04
[52] U.S. Cl. .................................... 123/421; 123/407; 123/408; 123/409
[58] Field of Search ................ 123/117 R, 117 A, 421, 123/407, 408, 409

[56] References Cited

U.S. PATENT DOCUMENTS

| | | | |
|---|---|---|---|
| 3,717,135 | 2/1973 | Mayashi | 123/117 A |
| 3,722,486 | 3/1977 | Rivere | 123/117 A |
| 3,776,205 | 12/1973 | Maruoka | 123/117 R |
| 3,793,833 | 2/1974 | Van Basshuysen | 123/117 A |
| 3,810,452 | 5/1974 | Morris | 123/117 A |
| 4,027,633 | 6/1977 | Otsubo | 123/117 A |
| 4,149,499 | 4/1979 | Kurihara | 123/117 A |

Primary Examiner—Ronald B. Cox
Attorney, Agent, or Firm—Finnegan, Henderson, Farabow, Garrett & Dunner

[57] ABSTRACT

An ignition control system for an internal combustion engine, having an on-off device for controlling, at every one operational cycle of the engine, a timing to generate a discharge arc flame in each of the spark plugs to ignite the combustible mixture in such a manner that said timing is advanced just after the engine, in a cold condition, is started, then, delayed and again advanced when the engine is warmed-up. A stable idling operation as well as a low emission of toxic components are obtained.

4 Claims, 7 Drawing Figures

IGNITION CONTROL SYSTEM FOR AN INTERNAL COMBUSTION ENGINE

FIELD OF THE INVENTION

The present invention relates to an ignition control system for an internal combustion engine, capable of easily starting an engine which is cold, and of decreasing the amount of emission of toxic components remaining in the exhaust gas of the engine.

BACKGROUND OF THE INVENTION

In order to decrease toxic component emission from a spark ignition type internal combustion engine provided with such a type of exhaust gas purifying device as a catalytic converter or a thermal reactor, it is a well known technique to control the ignition timing so that it is delayed to obtain an advance angle which is smaller than an optimum advance angle where a maximum combustion efficiency is attained. Due to the delayed ignition timing, so-called after-burning takes place in the exhaust system of the engine, so that the catalytic converter or the thermal reactor can easily attain an activated condition by which the toxic components are effectively purified. However, the delayed ignition timing adversely affects a stabilized idling operation of the engine, resulting in so-called engine stall after the first combustion cycle is attained, or in a low idling rotational speed of the engine.

In order to prevent such drawbacks from being generated, a system has been proposed wherein a choke breaker is provided with a vacuum line having an orifice therein, for controlling the rate of opening of a choke valve, to produce a rich air-fuel mixture after the first combustion cycle is attained. The rich air-fuel mixture serves to stabilize the idling operation of the engine on one hand. However, the rich air-fuel mixture is, on the other hand, apt to produce a large amount of carbon which is attached to spark plugs.

SUMMARY OF THE INVENTION

An object of the present invention is to provide an ignition control system for an internal combustion engine, capable of obtaining a stabilized idling condition without increasing the amount of toxic component emission from the engine in a cold condition.

Another object of the invention is to provide an ignition control system for an internal combustion engine capable of preventing attachment of carbon to the spark plugs when a cold engine is started.

A still further object of the invention is to provide an ignition control system provided with a catalytic converter capable of rapidly activating the catalyst contained in the converter when the engine in a cold condition is started.

According to the present invention, an ignition control system for a spark ignition type internal combustion engine is provided, said system comprising: an electrical current source; spark plug means; ignition coil means for generating a discharge arc flame in the spark plug means to ignite a combustible mixture when an electrical current of high voltage is formed in the ignition coil means, and; on-off means for controlling, at every operational cycle of the engine, a timing to disconnect the ignition coil means from the electrical current source to generate the electrical current in such a manner that said timing is advanced for a predetermined short period of time just after a cold engine is started, then is delayed, and is again advanced after the engine is warmed-up.

Since the ignition timing is advanced just after the engine is started, a sufficiently high enough rotational speed of the engine is obtained to stabilize the idling operation. Due to the delay of ignition timing after a predetermined short period of time has lapsed, a small amount of emission of toxic components is obtained during the warming-up operation of the engine, while the idling condition is stabilized.

DETAILED DESCRIPTION OF PREFERRED EMBODIMENTS

Figure 1A:
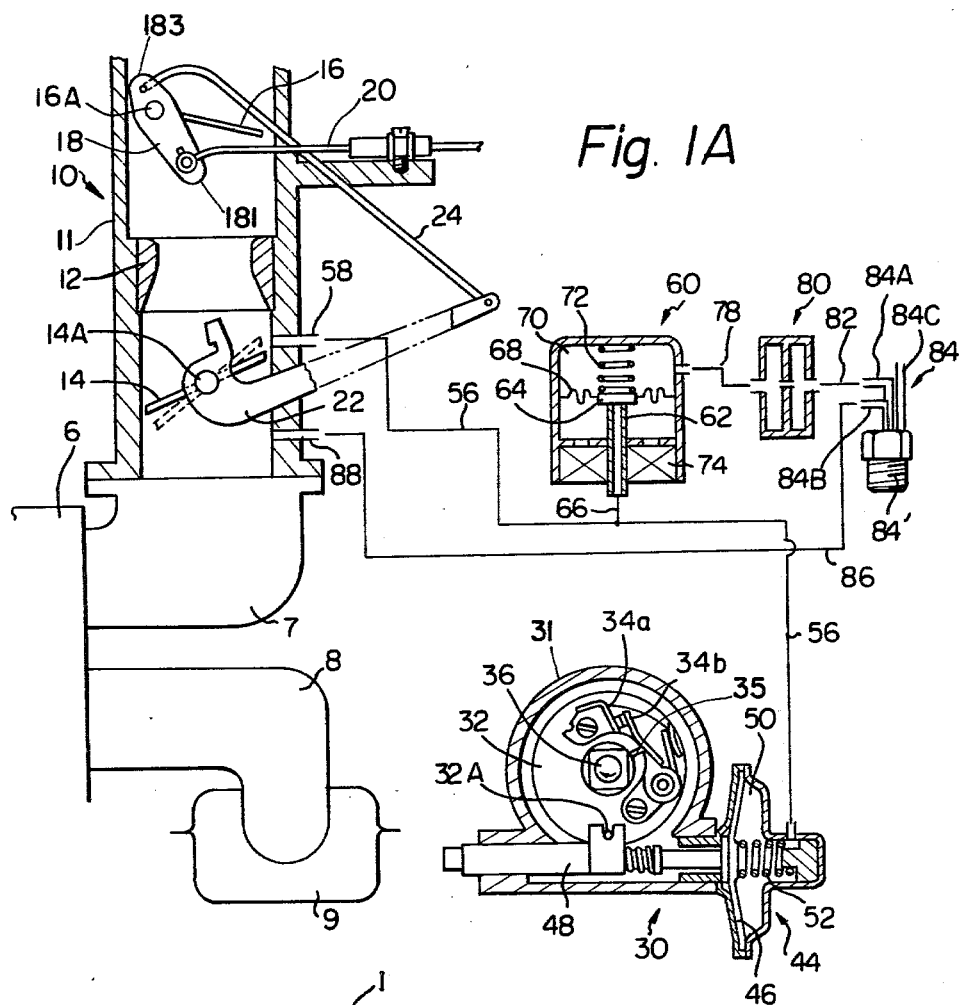
FIG. 1A illustrates an embodiment of an ignition control system according to the present invention.

Referring to FIG. 1A, a spark ignition type internal combustion engine, provided with an ignition timing control system according to the present invention, has a carburetor 10, an intake manifold 7 for receiving a combustible mixture from the carburetor 10, an engine body 6, an exhaust manifold 8 for receiving combustion gas from the engine body 6 and a catalytic converter 9 for purifying toxic components ($CO$, $HC$ and $NO_x$) in the exhaust gas.

The carburetor 10 has a horn 11 in which a venturi portion 12 is formed. A throttle valve 14, operated by a not shown acceleration pedal, is located in the horn 11 at a position located downstream of the venturi portion 12. The throttle valve 14 has a valve shaft 14A which is rotatably mounted to the horn 11. A choke valve 16 is arranged in the horn 11 at a position located upstream of the venturi portion 12 and has a valve shaft 16A which is rotatably mounted to the horn 11. A lever 18 is fixedly secured to the valve shaft 16A of the choke valve 16. The lever 18 is, on one end 181 thereof, attached to a cable 20 to which a not shown choke operating device is connected. The choke operating device may be a manual type or automatic type which is very well known to those skilled in this art. The device is adapted for moving the cable 20 in right-hand direction in FIG. 1, so as to cause the choke valve to be moved to its closed position when a cold engine is started.

In order to effect the ignition timing control operation according to the present invention, the carburetor 10 is advantageously provided with a so-called fast idle mechanism for maintaining the throttle valve 14 so that the valve 14 is opened from the idle position (or fully closed position) when the choke operating device is actuated during the starting of a cold engine. The fast idle mechanism has, in the embodiment shown FIG. 1A, a lever 22 which is on one end thereof mounted to the valve shaft 14A of the throttle valve 16, by means of a not shown one-way clutch means, in such a manner that the lever 22 is engaged with the valve shaft when the throttle valve 16 is moved in a counterclockwise direction to open the valve 16. A free end of the lever 22 remote from the valve shaft 14A is connected, by means of a connecting rod member 24, to the lever 18 at the other end 183 thereof remote from the end 181 to which the cable 20 is attached. When the cable 20 is actuated for closing the choke valve 16, the lever 18 integral with the valve shaft 16A causes the lever 22 to turn in counterclockwise direction, so that the throttle valve 14, capable of engaging with the lever 22, is maintained at a position shown by the dotted line in FIG. 1A, which is slightly opened from the idle position, as shown by the solid line in FIG. 1A, even if the not shown acceleration pedal is released.

Figure 1B:
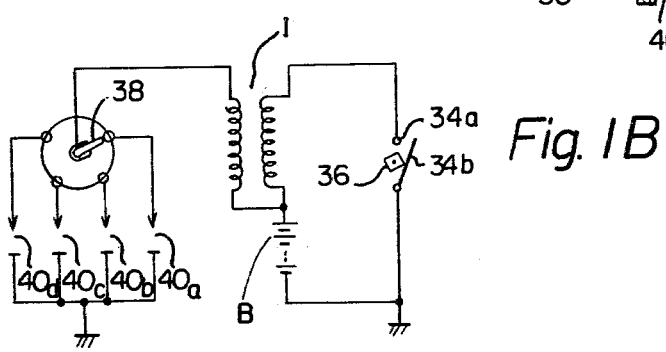
FIG. 1B illustrates an electrical system of the system illustrated in FIG. 1.

A reference numeral 30 denotes a distributor which has a casing 31 in which a breaker plate 32 is arranged. A pair of contacts 34a and 34b are mounted on the breaker plate 32. The contact 34b is spring urged to normally contact the contact 34a. A cam rod 36, which is driven by the not shown crankshaft of the engine, is located at the center of the breaker plate 32. When the engine is of a four cylinder type, the cam rod 36 has a square cross-sectional shape. Each time one of the corners of the square is engaged with a projection member 35 of the contact 34b, the contact 34b is detached from the contact 34a. As shown in FIG. 1B, a rotor 38 is mounted on the cam shaft 36 for connecting an ignition coil I with a spark plug 40a, 40b, 40c or 40d one after another during the rotation of the engine, each of the spark plugs being mounted in a corresponding cylinder. The pair of contacts 34a and 34b and the cam rod 36 form an on-off switch mechanism for intermittently connecting a battery B with the ignition coil I. Therefore, an electrical current of high voltage is, during the rotation of the cam rod as shown by an arrow, generated in the ignition coil every time one of the corner portions of the cam rod 36 disconnects the contact 34b from the contact 34a, so that one of the spark gap plugs connected to the rotor 38 produces a discharge arc flame to cause combustible mixture to ignite in a corresponding cylinder.

The distributor 30, as shown in FIG. 1A, further has an actuator 44 of vacuum operated type. The vacuum actuator 44 has a diaphragm 46 which is connected to an advance control shaft 48 on one end thereof. The shaft 48 is engaged with a pin 32A fixedly attached to the breaker plate 32. On one side of the diaphragm 46 remote from the shaft 48, a vacuum chamber (or an advance control chamber) 50 is formed. In the chamber 50 a spring 52 is arranged for urging the diaphragm 46 so that the shaft 48 is moved in left-hand direction of FIG. 1, i.e., the breaker plate 32 is turned in a clockwise direction. The more the breaker plate 32 is turned in the clockwise direction, the further delayed the ignition timing becomes, because the ignition timing is determined by the time when the contact 34b is detached from the contact 34a by one of the corners of the cam rod 36.

In order to properly control the ignition timing of the engine, the vacuum chamber 50 of the actuator 44 of the distributor 30 is connected, via a vacuum line 56, to a vacuum port (so-called advance port) 58 formed in the carburetor 10 at a position located slightly above the throttle valve 14 in its idle position, as shown by the solid line in FIG. 1A. Thus, a vacuum force may be formed in the chamber 50 to displace the diaphragm 46 against the spring 52 so that the shaft 48 is moved to the right in FIG. 1A for turning the breaker plate 32 in the counterclockwise direction. Thus, the ignition timing is controlled in accordance with the degree of vacuum in the chamber 50.

According to the embodiment shown in FIG. 1A, a mechanism, which will be described here-in-below, is further provided for controlling the ignition timing of the engine, in order to maintain a stable rotation of the engine and a rapid activation of the catalytic converter 9 when the engine is started from a cold temperature condition.

The reference numeral 60 denotes an air control valve for controlling the vacuum level in the chamber 50 of the actuator 44. The air control valve 60, of vacuum drive type, is provided with a valve port 62 of tubular shape, one end of which is connected, via a vacuum line 66, to the vacuum line 56, connecting the advance port 58 with the chamber 50. Facing the other end of the valve port 62, serving as a valve seat, is a valve member 64 mounted to a diaphragm 68. The diaphragm 68 forms, on one end thereof remote from the valve port 62, a vacuum chamber 70 in which a spring 72 is arranged for urging the valve member 64 to be rested on the valve port 62. A space formed below the diaphragm 68 is opened to the atmosphere via an air filter 74. Thus, the valve member 64 selectively opens the valve port 62 to the atmosphere in accordance with the vacuum level in the chamber 70, so that the vacuum level in the chamber 50 i.e., the ignition timing, is controlled.

In order to carry out the above mentioned operation of the air control valve 60, the vacuum chamber 70 thereof is connected, via a vacuum line 78, an orifice 80, a vacuum line 82, a temperature sensitive valve 84 and a vacuum line 86, to a second vacuum port 88 formed in the carburetor 10 at a position always located downstream of the throttle valve 14. The temperature sensitive valve 84 is of a well known three port type, which is, in accordance with the temperature of the engine, switched between a first position where a common port 84A is connected to a first switching port 84B and a second position where the common port 84A is connected to a second switching port 84C. The valve 84 has a detector end 84' adapted to be mounted on a desired portion of the engine to detect the temperature of the engine. For example, the detector end 84' may be arranged to contact cooling water contained in a water jacket formed in the engine body. When the temperature of the engine detected by the end 84' is lower than a predetermined value, the valve 84 is in its first position, so that the common port 84A, opened to the vacuum line 82, is connected to the first switching port 84B, opened to the vacuum line 86. When the temperature of the engine is higher than a predetermined value, the valve is in its second position, so that the common port 84A is connected to the second switching port 84C, opened to the atmosphere.

The embodiment shown in FIGS. 1A and 1B operates as follows.

When the engine which is not operating is cold, the temperature sensitive valve 84 is in its first position, wherein the common port 84A is connected to the first switching port 84B. Therefore, the second vacuum port 88, under a pressure close to atmospheric pressure, communicates with the vacuum chamber 70 of the air control valve 60 via the vacuum line 86, the ports 84B and 84A, the vacuum line 82, the orifice 80 and the vacuum line 78. Therefore, the chamber 70 is, during the time the engine is not operated, also maintained at a pressure close to atmospheric pressure, so that the valve member 64 is moved downwardly by the spring 72 causing the valve member 64 to rest on the port 62. Therefore, the vacuum line 56 is disconnected from the air filter 74. Prior to starting the cold engine, the choke operating mechanism connected to the cable 20, is actuated so that the cable 20 is moved to the right in the Figure. This causes the choke valve 16 to move in the counterclockwise direction, from an open position to a closed position, and causes the throttle valve 14 to move also in a counterclockwise direction, from the idle position as shown by the solid line to the slightly opened position as shown by the dotted line, due to the existence of the fast idle mechanism comprised of the rod 24 and the lever 22. In this latter position the advance port 58 is engaged with the throttle valve 14.

When the engine is started and is in an idle operation, vacuum is formed not only at the second port 88, always located downstream of the throttle valve, but also at the advance port 58, which is also located downstream of the throttle valve, when slightly opened as shown by the dotted line. A vacuum signal from the second port 88 is allowed to enter into the chamber 70 of the air control valve, since the thermo-valve 84 is, due to the low temperature of the engine, in its first position where the ports 84A and 84B are connected with each other. However, since the orifice 80 is located between the chamber 70 and the valve 84, the vacuum in the chamber 70 is, just after the engine is started, low enough, so that the spring 72 urges the valve member 64 to rest on the valve port 62. Thus, the introduction of air from the air filter 74 into the vacuum line 56, located between the advance port 58 and the advance control chamber 50 of the distributer vacuum actuator 44, does not take place. Therefore, the vacuum level at the advance control chamber 50 is, just after the engine is started, is substantially equal to the vacuum level at the advance port 58. The vacuum is strong enough to cause the shaft 48 to be moved to the right in the Figure, so that the ignition timing is advanced and causes the rotational speed of the engine to increase to a level which is high enough to prevent a so-called "engine stall" from occurring.

When a predetermined period, which is determined by the dimensions of the orifice 80 and the chamber 70, has elapsed from the beginning of the start of the cold engine, i.e., when the idle operation of the engine is stabilized, the vacuum level in the chamber 70 becomes strong enough to cause the valve member 64 to be detached from the valve port 62 against the force of the spring 72. Thus, atmospheric air from the air filter 74 is allowed to enter into the vacuum line 56 connecting the advance port 58 with the advance control chamber 50. The introduction of air into the vacuum line 56 causes the effect of the vacuum to decrease at the advance control chamber 50, so that the spring 52 causes the shaft 48 to move to the left in the Figure. Therefore, the ignition timing is delayed, causing a so-called afterburning effect to be generated in the exhaust system of the engine. This causes the activation of the catalytic converter to be promoted in order to effectively decrease the emission of CO and HC components from the engine. The delay of the ignition timing does not cause the engine to stall since the rotational speed of the engine is already high.

When the engine is fully warmed-up, i.e., the temperature of the engine detected by the end 84' is higher than the predetermined value, the thermo-valve 84 is switched to the second position in which the common port 84A is connected to the second switching port 84C. Thus, the chamber 70 of the air control valve 60 is disconnected from the vacuum port 88 and is opened to the atmosphere. Therefore, the pressure in the chamber 70 becomes equal to atmospheric pressure, so that the spring 72 urges the valve plate 64 to rest on the port 62, causing the vacuum line 56 to be disconnected from the atmosphere. As a result of this, the vacuum in the advance control chamber 50 of the distributor 30 is strong enough to move the shaft 48 to the right in the Figure, so that the ignition timing is again advanced and is controlled by the vacuum at the advance port 58 to obtain a maximum combustion efficiency.

The present invention does not utilize a rich air-fuel mixture for preventing an engine stall from occurring. Thus, the contamination of the spark electrodes by carbon does not take place and a high fuel consumption efficiency can be obtained.

Figure 2:
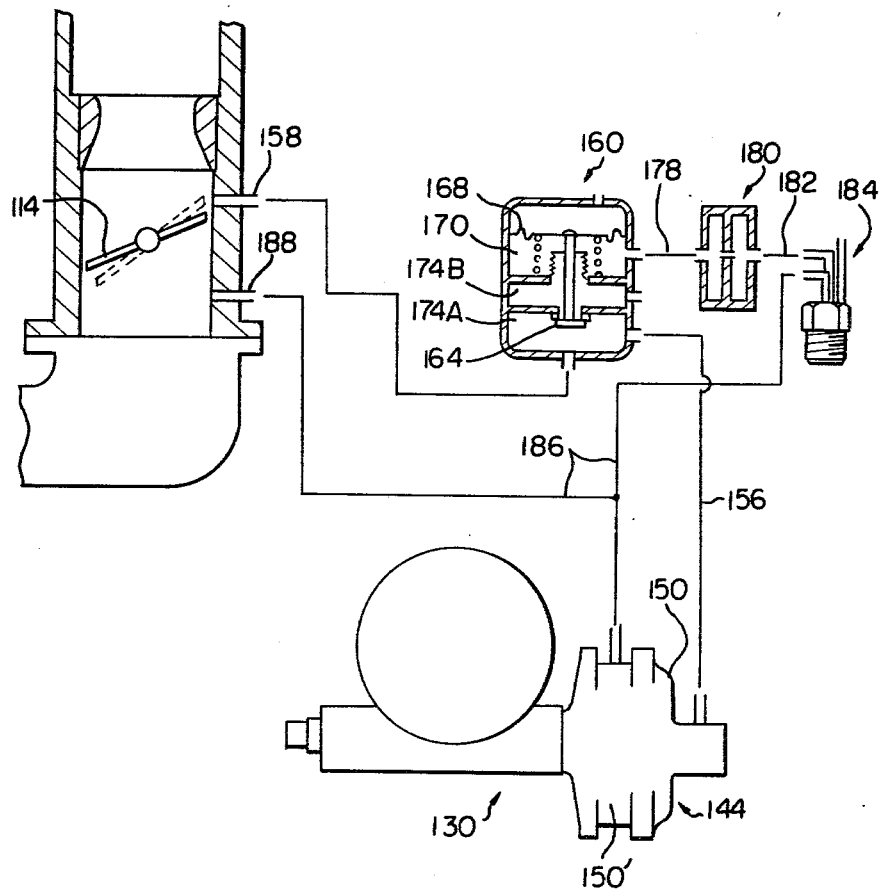
FIG. 2 illustrates another embodiment of the invention, in which a double diaphragm type vacuum actuator is utilized.

The second embodiment shown in FIG. 2 has a vacuum drive type air control valve 160 which is slightly modified from the air control valve 60 shown in FIG. 1A. The air control valve 160 has a valve member 164 for selectively connecting a first air chamber 174A with a second air chamber 174B. The first air chamber 174A is located on a vacuum line 156 connecting an advance port 158 with an advance control chamber 150 of an actuator 144 of a distributer 130. The second air chamber 174B is always open to the atmosphere. The valve member 164 is connected to a diaphragm 168, which defines a vacuum chamber 170 on one side thereof facing the valve member 164. The vacuum chamber 170 is, similar to FIG. 1A, connected to a second vacuum port 188 via a vacuum line 178, an orifice 180, a vacuum line 182, a thermosensitive valve 184 and a vacuum line 186. The air control valve 160 operates in similar way to the air control valve 60. Until a predetermined short period, which is determined by the dimensions of the orifice 180 and the chamber 170, has elapsed from the starting of a cold engine, the vacuum in the chamber 170 is weak enough to cause the valve member 164 to be seated on the valve seat, so that the first chamber 174A is disconnected from the second chamber 174B open to the atmosphere. Thus, a vacuum signal, derived from the advance port 158 located downstream of the throttle valve 114 which is maintained slightly open as shown by dotted line, by means of the fast idle device, is allowed to enter into the advance control chamber 150, so that the vacuum level of this chamber is substantially equal to that of the advance port 158. Therefore, the ignition timing of the engine is sufficiently advanced to stabilize the rotation of the engine. After the predetermined short period has elapsed, the vacuum in the chamber 170 of the air control valve 160 is strong enough to cause the valve member 164 to be detached from the valve seat, which causes the air chamber 174B to communicate with the chamber 174A. Thus, atmospheric air is introduced into the vacuum line 156 to decrease the effect of vacuum in the chamber 150 of the actuator 144 of the distributer 130, so that ignition timing is delayed enough to promote the activation of the catalytic converter arranged in the exhaust system of the engine. After the engine is fully warmed-up, the thermo-valve 184 disconnects the chamber 170 of the air control valve 160 from the vacuum port 188 and connects the chamber 170 with the atmosphere. Thus, the valve member 164 is seated on the valve seat for stopping the introduction of air into the vacuum line 156, so that the vacuum level in the chamber 150 becomes strong enough to obtain a maximum combustion efficiency.

The embodiment shown in FIG. 2 is also different from the embodiment shown in FIG. 1 in that the actuator 144 of the distributer 130 is of a so-called double diaphragm type having, in addition to the advance control chamber 150, a second advance control chamber 150'. The advance control chamber 150 is, as already described, connected to the vacuum line 156 open to the advance port 158 in order to effect the above mentioned ignition timing control operation according to the present invention. The second advance control chamber 150' is connected to the vacuum line 186 open to the second vacuum port 188, in order to effect, as is well known to those skilled in this art, an advance control operation during the idle condition of the engine in the fully warmed-up condition of the engine.

It should be noted that the system shown in FIG. 2 may utilize the distributer actuator of single diaphragm, as shown in FIG. 1A, and the system shown in FIG. 1A may utilize the double diaphragm actuator, as shown in FIG. 2.

Figure 3A:
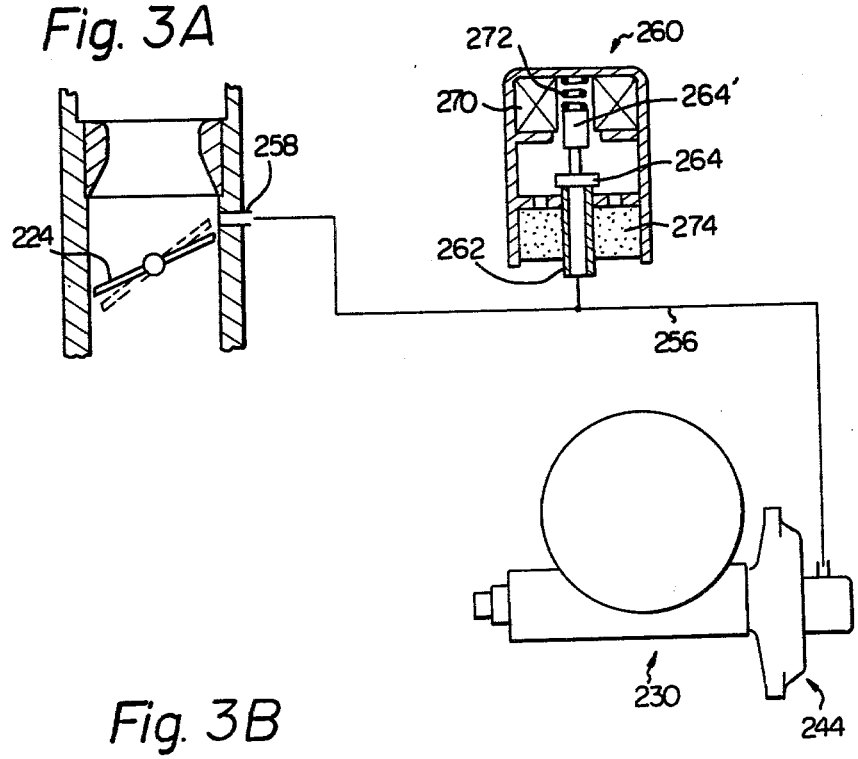
FIG. 3A illustrates another embodiment of the invention, in which an electro-magnetic type air control valve is used.
Figure 3B:
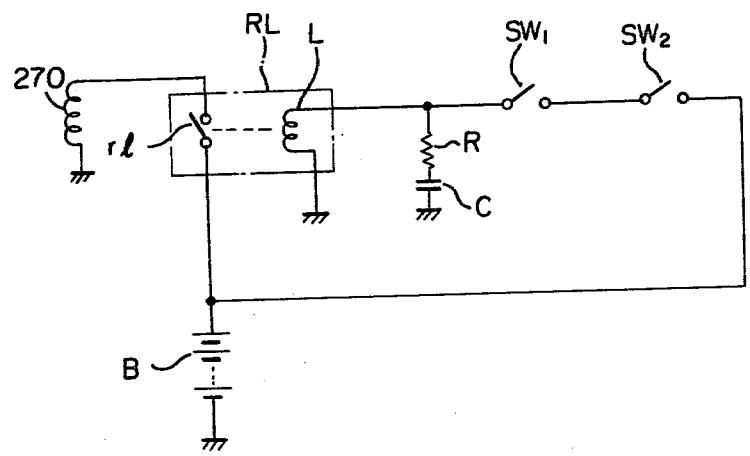
FIG. 3B illustrates an electrical system for operating the air control valve in FIG. 3A.

In the embodiment shown in FIG. 3A, an electric device is utilized in order to control the introduction of air into a vacuum line 256 connecting an advance port 258 and the actuator 244. The reference numeral 260 denotes an air control valve of an electro-magnetic drive type. The air control valve 260 has a valve port of tubular shape 262, which is on one end thereof open to the vacuum line 256. The other end of the pipe 262 defines a valve seat on which a valve member 264 may be seated. The valve member 264 forms an operating piece 264' which is located in a solenoid 270 of tubular shape. A spring 272 urges the operating piece 264' so that the valve member 264 is rested on the pipe 262. When the solenoid 270 is energized, the operating piece 264' displaces upwardly against the force of the spring 272 for communicating the pipe 262 with the air filter 274. When the solenoid 270 is de-energized, the valve member 264 is moved downwardly by the force of the spring 272 to rest on the pipe 264, causing the pipe 262 to be disconnected from the air filter 274. The solenoid 270 is operated by an electrical circuit, as shown in FIG. 3B, in order to control the ignition timing in such a manner that it is advanced for a short period of time just after the engine is started, then delayed, and again advanced after the engine is fully warmed-up. The electric circuit shown in FIG. 3B includes a relay unit RL, having a switch portion rl which is normally in the OFF condition, and a coil portion L. The switch portion rl, when it is in its ON condition, connects a battery B with the solenoid 270 of the air control valve to generate an electrical current in the solenoid 270. The electrical circuit further has a switch $SW_1$ responsive to the temperature of the engine and another switch $SW_2$ responsive to the start of the engine, which switches are connected in series with each other for controlling an electrical connection between the coil portion L of the relay RL and the battery B. As the temperature sensitive switch $SW_1$, a well-known thermo-switch, which is in its ON condition when the temperature of the engine is lower than a predetermined value, may be utilized. As the engine start detecting switch, $SW_2$, a well-known vacuum switch, which is in its ON condition when the engine is under rotation, may be utilized. The circuit further has a delay unit T connected in parallel to the coil portion L for electrically disconnecting the coil portion L from the battery B for a predetermined short period of time just after a cold engine is started. The delay unit T comprises a resistor element R and a capacitor element C, which are connected in series with each other.

The apparatus shown in FIGS. 3A and 3B operates as follows. A cold engine which is stopped causes the thermo-switch $SW_1$, to maintain its ON condition. When the engine is started the vacuum switch $SW_2$, for detecting the rotation of the engine, is also switched to its ON condition. However, due to the existence of the delay unit T comprising the resistor element R and the capacitor element C, the electric current is only directed to the delay unit T and is not directed to the coil portion L of the relay RL, causing the switch portion rl to maintain its OFF condition. Thus, the solenoid 270 is de-energized, so that the valve member 264 is seated on the pipe 262 for disconnecting it from the air filter 274. Therefore, a full vacuum derived from the advance port 258, which is located downstream of the throttle valve 224 in its slightly opened position, as shown by a dotted line, due to the operation of the fast idle mechanism, is allowed to enter into the actuator 244 of the distributer 230. Thus, the ignition timing is advanced to a sufficient degree to stabilize the rotation of the engine. When a period of time which is determined by the resistor element R and the capacitor element C has elapsed, the capacitor element C is fully charged, and therefore, the electric current from the battery B is allowed to enter the coil portion L of the relay RL. Thus, the switch portion rl is switched to its ON condition so that the solenoid 270 of the air control valve 270 is energized. As a result of this, the valve member 264 is detached from the pipe 262 for introducing the atmospheric air from the air filter into the vacuum line 256, so that the effect of the vacuum in the advance control actuator 244 is decreased. Thus, ignition timing is delayed enough to promote the activation of the catalytic converter arranged in the exhaust system of the engine. When the engine is fully warmed-up, the thermo-switch $SW_1$ is switched to the OFF condition, for disconnecting the battery B from the coil portion L of the relay RL, so that the switch portion rl is opened. Thus, the solenoid 270 is again de-energized for seating the valve member 264 on the pipe 262, so that the full vacuum at the advance port 258 is subjected to the advance control actuator 244 of the distributer 230. As a result of this, an advance of ignition timing of a desired level may be obtained.

Figure 4A:
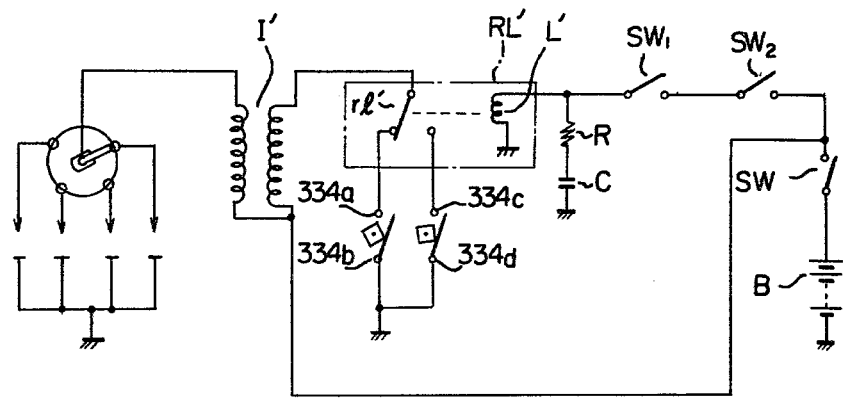
FIG. 4A illustrates still another embodiment of the invention, wherein two pairs of contacts are utilized.
Figure 4B:
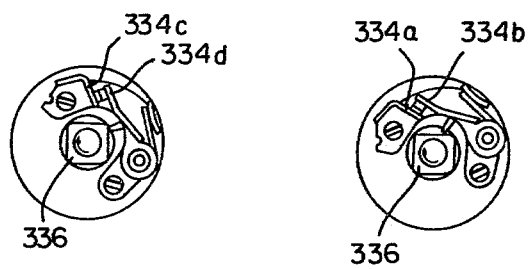
FIG. 4B illustrates an arrangement of the two pairs of contacts with respect to a common cam member.

In another embodiment shown in FIG. 4A, in place of using one on-off unit comprising the contacts 34a and 34b as shown in FIG. 1B, two on-off units are utilized. One of the on-off units, which comprises pair of contacts 334a and 334b, is adapted of controlling the ignition timing of the engine so that it is advanced. The other on-off unit, which comprises a pair of contacts 334c and 334d, is adapted for controlling the ignition timing so that it is delayed. As shown in FIG. 4B, the first on-off unit, comprising the contacts 334a and 334b, as well as the second on-off unit, comprising the contacts 334c and 334d, are both operated by a common cam member 336 which rotates together with the rotation of the engine. However, the angular positions of the first and the second on-off units are different from each other in such a manner that the time when an operating member 335 of the first on-off unit contacts an operating member 335 during the rotation thereof is earlier than the time when an operating member 335' of the second on-off unit contacts the cam member 336. The first pair of contacts 334a and 334b and the second pair of the contacts 334c and 334d are, are as shown in FIG. 4A, arranged in a parallel condition. A relay unit RL' is utilized for selectively operating one of the first or the second pairs of contacts. The relay RL' comprises a switch portion rl' and a coil portion L'. The switch portion rl' is normally in a condition, as shown by a solid line $m_1$, wherein the electric connection of the ignition coil I' with the battery B is controlled by the first pair of contacts 334a and 334b. When the coil portion L' is energized, the switch portion rl' is, as shown by a dotted line $m_2$, adapted to control the electrical connection between the ignition coil I' and the battery B by the second pair of the contacts 334c and 334d. The coil portion L' of the relay unit RL' is operated by an electrical circuit which is substantially the same as that in FIG. 3A, and has a thermo-switch $SW_1$ for detecting the temperature of the engine, a switch $SW_2$ for detecting the start of the engine, and a delay unit having a resistor element R and a capacitor le element C.

The system as shown in FIGS. 4A and 4B operates as follows. When the engine is cold, the thermo-switch $SW_1$ is in the ON condition. When the ignition switch SW is closed to start the engine rotating, the vacuum switch $SW_2$ is also closed. The coil portion L' of the relay unit RL' is, however, not energized for a predetermined short period of time from the start of the engine due to the existence of the delay unit comprising the elements R and C. Thus, the switch portion rl' is, just after the engine is started, under the first condition as shown by a solid line $m_1$, wherein the generation of an electrical current in the ignition coil I' is controlled by the first pair of contacts 334a and 334b. Thus, the disconnection of the contact 334b from the contact 334a, i.e., the generation of a high voltage electrical current by means of the rotation of the cam 334 take place earlier. Thus, the ignition timing is advanced for obtaining a high enough rotational speed to maintain a stable idling operation of the engine.

When the time which is determined by the resistor R and the capacitor C has elapsed from the start of the engine, the coil portion L' of the relay RL' is energized and, thus, the switch portion rl' is switched to the condition as shown by the dotted line $m_2$, wherein the generation of the electrical current in the ignition coil I' is determined by the second pair of contacts 334c and 334d. Thus, the disconnection of the contact 334d from the contact 334c, for generating a high voltage electrical current in the ignition coil I', takes place later during every rotation of the cam member 336. Therefore, the ignition timing is delayed for effecting a rapid activation of the catalytic converter.

After the engine is warmed-up, the thermo-switch $SW_1$ is switched to the OFF condition for de-energizing the coil portion L' of the relay unit RL. Thus, the generation of the electrical current in the ignition coil-I' is controlled by the first pair of contacts 334a and 334b, so that the ignition timing is again advanced.

While the embodiments of the present invention have been herein-above described with reference to the appended drawings, many modifications and changes can be made by those skilled in this art without departing from the scope of the present invention.

What is claimed is:

1. An internal combustion engine comprising:
   an engine body;
   an intake system;
   an exhaust system;
   a catalytic converter arranged in the exhaust system;
   a throttle valve arranged in the intake system;
   a choke valve arranged upstream of the throttle valve;
   a choke operating mechanism;
   a lever-link mechanism co-operating with the choke operating mechanism for maintaining the throttle valve in its slightly opened position when the choke valve is in its closed condition in order to start the engine which is cold;
   ignition control means for igniting, at every operational cycle of the engine, the combustible mixture introduced into the engine body via the intake system;
   vacuum actuator means having an advance control chamber for controlling, in accordance with the vacuum level therein, the ignition timing;
   a vacuum line connecting the advance control chamber with a first vacuum port formed in the intake system at a position located slightly upstream of the fully closed throttle valve; and
   a vacuum control valve means, comprising:
      a valve seat which is on one end thereof opened to the vacuum line and which is on the other end thereof opened to the atmosphere;
      a valve member normally resting on the valve seat to disconnect the vacuum line from the atmosphere;
      a spring urged diaphragm to which the valve member is attached and a vacuum chamber formed on one side thereof remote from the valve seat;
      a second vacuum line connecting a second port, formed in the intake system at a position always located downstream of the throttle valve, with the vacuum chamber;
      a temperature sensitive valve to connect said second vacuum line with said vacuum chamber when the temperature of the engine is lower than a predetermined value and to connect said second vacuum line with atmosphere when the temperature of the engine is above a predetermined value; and
      a time-delay orifice arranged in the second vacuum line between said temperature sensitive valve and said vacuum chamber to delay application of vacuum from said second vacuum line to said vacuum chamber;
   said vacuum control valve means introducing atmospheric air into the vacuum line for controlling, in a cold condition of the engine, the vacuum level in the advance control chamber of the actuator means after a predetermined period of time has elapsed from the start of the engine, whereby the ignition timing is, firstly, advanced to obtain a stabilized idle operation, then, delayed to rapidly activate the catalytic converter and again advanced after the engine is fully warmed-up.

2. An ignition control system for a spark initiation-type internal combustion engine, said system comprising:
   an electrical current source;
   a spark plug means in the engine;
   ignition coil means having a primary circuit in electrical connection with the electrical current source and a secondary circuit in electrical connection with the spark plug means;

breaker means arranged in the primary circuit for selectively opening said primary circuit so that a high voltage electrical current is generated in said secondary circuit of the ignition coil means for generating the discharge arc flame in the spark plug means to ignite a combustible mixture in the engine;

ignition timing control means responsive to a vacuum signal applied thereto for operating the breaker means so that the combustible mixture is ignited at a normal crank angle when the vacuum signal is not applied to the ignition timing control means and is ignited at a later crank angle when the vacuum signal is applied to the ignition timing control means;

a vacuum circuit connecting the ignition timing control means with a vacuum signal port formed in the engine;

a temperature sensitive valve for allowing the transmission of the vacuum signal when the temperature of the engine is lower than a predetermined value and for preventing the transmission of the vacuum signal when the temperature is higher than the predetermined value; and a vacuum delay orifice means for restricting the speed of transmission of the vacuum signal from the vacuum signal port to the ignition timing control means so that the vacuum signal is received by the ignition timing control means after a predetermined time has elapsed from the starting of the engine, said temperature sensitive valve and said vacuum delay orifice means being connected in series with each other so that the transmission of the vacuum signal is prevented from igniting the combustible mixture at the normal crank angle when the predetermined time is not elapsed and when the temperature of the engine is lower than the predetermined value, the transmission of the vacuum signal is then allowed to ignite the combustible mixture at the later crank angle when the predetermined time has elapsed and when the temperature of the engine is still lower than the predetermined value, and the transmission of the vacuum signal is again prevented from igniting the combustible mixture at the normal crank angle when the temperature of the engine becomes higher than the predetermined value.

3. An ignition control system according to claim 2, wherein said ignition timing control means comprise a vacuum actuator for controlling, in accordance with the vacuum level therein, a crank angle where the breaker means is operated to ignite the combustible mixture, a vacuum line connecting the vacuum actuator with a vacuum signal port in the engine, and a vacuum control valve located in the vacuum line, which vacuum control valve has a control chamber which is connected to the vacuum circuit, the valve being opened for introducing an air into the vacuum line for decreasing the effect of the vacuum in the vacuum actuator to ignite the combustible mixture at the later crank angle when the vacuum signal is received by the control chamber of the vacuum control valve, the valve being closed for stopping the introduction of air into the vacuum line for maintaining the effect of the vacuum in the vacuum actuator to ignite the combustible mixture at the normal crank angle, when the vacuum signal not received by the control chamber of the vacuum control valve.

4. An ignition control system according to claim 2, wherein said ignition timing control means being adapted for operating the breaker means so that the breaker means is operated at said normal crank angle when an electrical signal is not received by the control means and is operated at said later crank angle when the electrical signal is received by the control means, wherein said operating signal circuit means comprise an electrical circuit connecting the ignition timing control means with an electrical current source serving as the operating signal source, wherein said temperature sensor means comprise a temperature sensitive switch in closed condition when temperature of the engine is lower than the predetermined value and in open condition when the temperature of the engine is higher than the predetermined value, and wherein said timer means comprise an engine rotational speed switch which is in open condition when the engine is stopped and is in closed condition when the engine is rotated, which engine switch is connected to said electrical circuit in series with the temperature sensitive switch so that the electrical signal is applied to the ignition timing control means when both switches are closed, and a delay means arranged between both switches and the ignition timing control means for preventing the transmission of the electrical signal to the control means for the predetermined period after both switches are closed.

* * * * *